Nov. 5, 1935.  E. E. FOSTER  2,019,849
TRANSMISSION
Original Filed Oct. 5, 1932    4 Sheets-Sheet 1
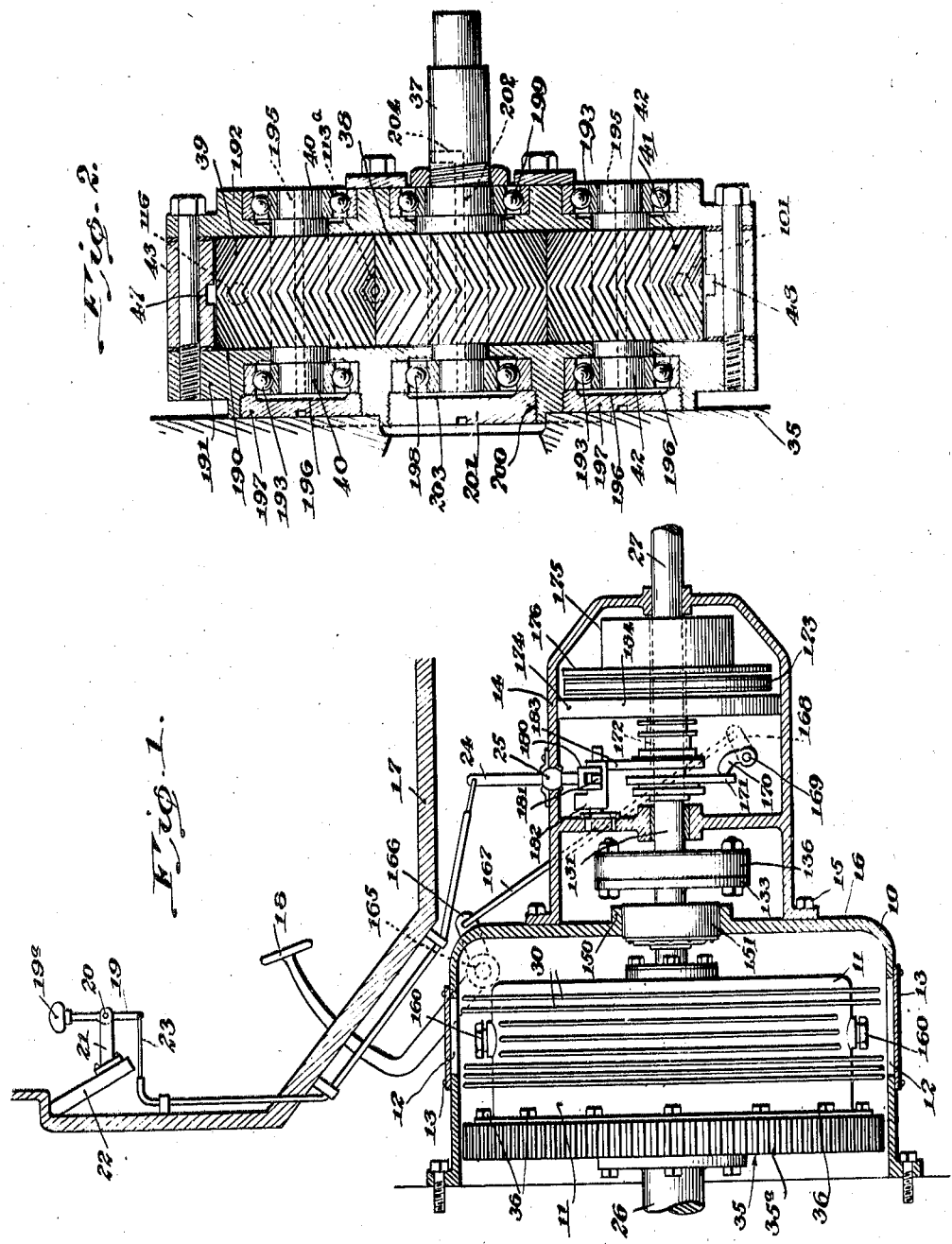
WITNESSES
INVENTOR
E. E. Foster,
BY
Munn & Co
ATTORNEY

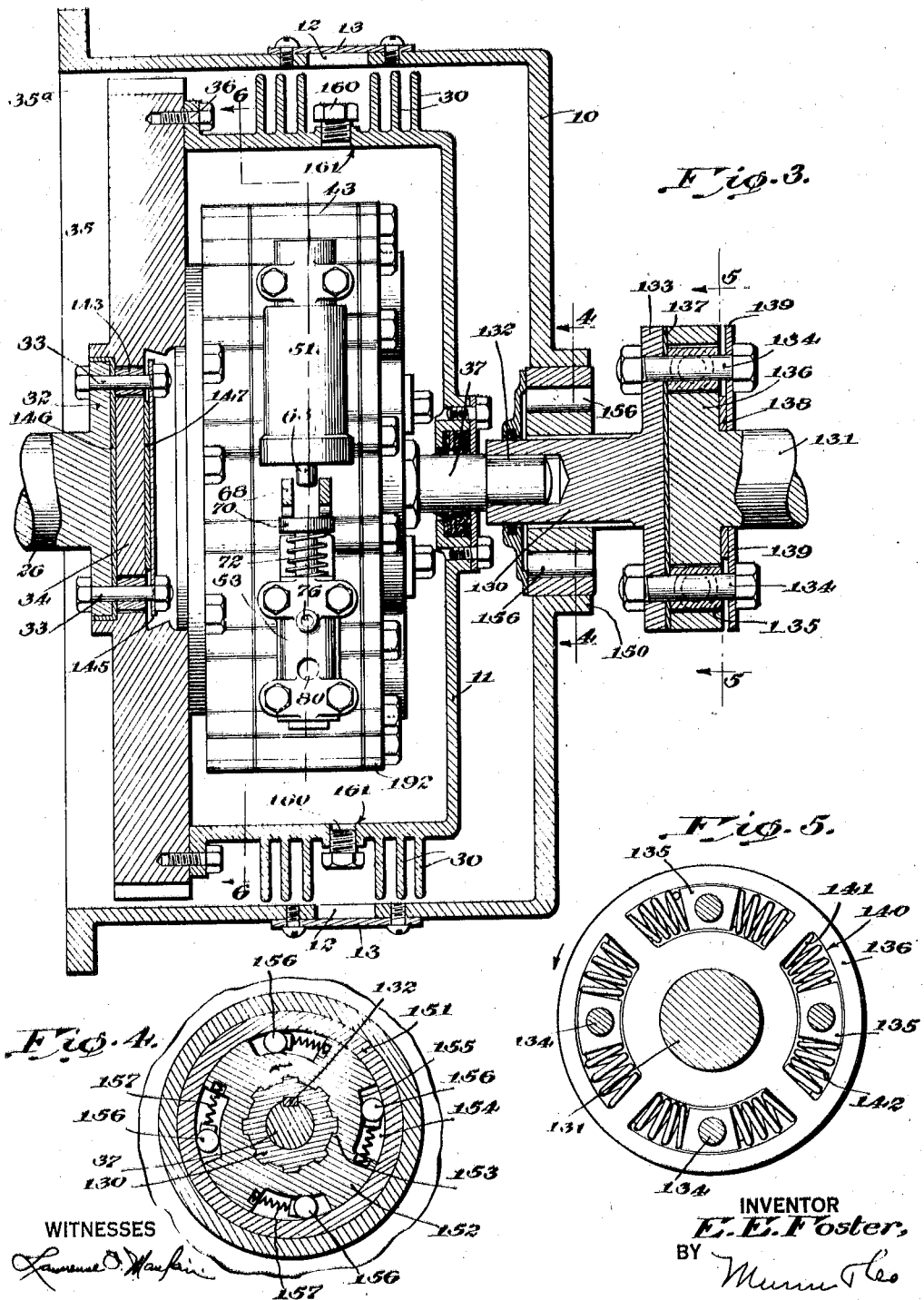

Nov. 5, 1935.  E. E. FOSTER  2,019,849

TRANSMISSION

Original Filed Oct. 5, 1932   4 Sheets-Sheet 3

WITNESSES

INVENTOR
E. E. Foster,
BY
ATTORNEY

Nov. 5, 1935.  E. E. FOSTER  2,019,849

TRANSMISSION

Original Filed Oct. 5, 1932    4 Sheets-Sheet 4

WITNESSES

INVENTOR
E. E. Foster,
BY
ATTORNEY

Patented Nov. 5, 1935

2,019,849

UNITED STATES PATENT OFFICE 2,019,849

TRANSMISSION

Edwin E. Foster, Austin, Tex.

Application October 5, 1932, Serial No. 636,408
Renewed May 20, 1935

7 Claims. (Cl. 74—294)

This invention relates to transmissions.

An object of the invention is the provision of a device for connecting a revolving member with a member adapted to be revolved in such a manner that not only variable speeds may be provided for the member to be revolved but said member will have an increased torque in order to take care of the loads imposed upon the member to be revolved.

Another object of the invention is the provision of a device for transmitting power between a revolving member and a member to be revolved at varying speeds, the device being capable when actuated of creating a plurality of successive impacts with an intermediate means between the revolving member and the member to be revolved for storing up energy while further means is employed for causing the stored up energy to be expended in a continuous manner for causing rotation of the member to be revolved.

A further object of the invention is the provision of a transmission between a revolving member and a member to be revolved, the transmission including means tending to store up some of the energy being imparted to the member to be revolved with means for causing the stored up energy to be released in the direction of rotation of the member to be revolved so that the member to be revolved will have an increased torque in accordance with certain variations in speed of said member.

A still further object of the invention is the provision of a fluid transmission in which a plurality of gears intermesh forming in effect a pump in which the discharge port is maintained constant while the inlet to the pump is varied in order to create variation in speed with an increased torque, a governor being employed for controlling the inlet in accordance with variations in speed of a revolving member.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

In the drawings:

Figure 1 is a vertical section of a transmission unit constructed in accordance with the principles of my invention, Figure 2 is a longitudinal vertical section of a fluid transmission per se, Figure 3 is a vertical section taken along the line 3—3 of Figure 6, Figure 4 is a transverse vertical section taken along the line 4—4 of Figure 3, Figure 5 is a transverse vertical section taken along the line 5—5 of Figure 3, and Figure 6 is a vertical section taken along the line 6—6 of Figure 3.

Figure 7 is an enlarged fragmentary vertical section of the transmission showing the controller plunger in a different position from that shown in Figure 6.

Figure 8:
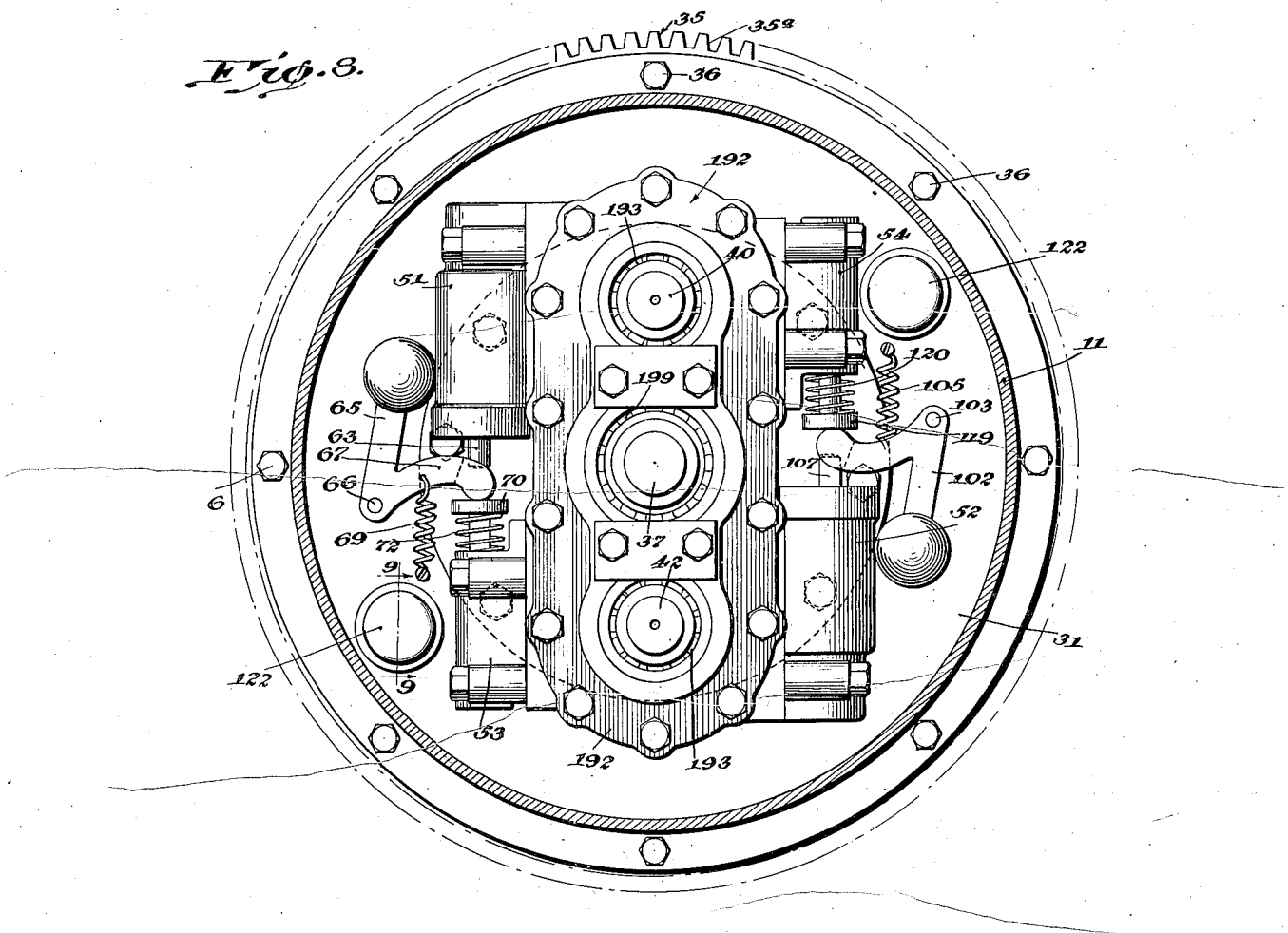
Figure 8 is a side view in elevation partly in section of the fluid transmission.

Referring more particularly to the drawings, 10 designates a housing which encloses a transmission casing 11. This housing is connected to the flywheel housing, not shown. The upper portion of the housing 10 is provided with an opening 12 normally closed by a cover 13.

An auxiliary housing 14 is secured at 15 to the rear wall 16 of the housing 10 and encloses mechanism which will be presently explained.

The housings 10 and 14 are located below the floor boards 17 through which project a clutch pedal 18.

A control lever 19 is pivoted at 20 on a bracket 21 carried by the dash 22. A Bowdin wire 23 has one end connected to the lever 19, the other end being connected to a shift lever 24 which has a universal mounting at 25 in the top of the auxiliary housing 14.

A drive shaft 26 extending from the unit, not shown, projects into the housing 10. A driven shaft 27 projects from the auxiliary housing 14.

The transmission includes principally three important elements, a fluid transmission, a device for storing up energy, and a device for preventing reverse rotation of a driven shaft so that the energy-storing device will be able to release the energy in the same direction as the direction of rotation of the driven shaft.

A fluid transmission is embraced by the casing 11, as shown more particularly in Figs. 3, 6 and 8, which has fins 30 for the purpose of radiating heat. Located within the interior 31 of the casing 30 is a fluid transmission and the interior chamber 31 is filled with a liquid, such as oil.

As shown more particularly in Fig. 3, the driving shaft 26 from the motor is provided with a plate 32 and this plate is connected by means of bolts 33 with a cushioning means, generally designated by the numeral 34 and this cushioning means forms a connection between the shaft 26 and a flywheel 35 which is rigidly connected to the casing 11, as shown at 36.

Referring more particularly to Figure 6, it will be seen that a shaft 37 is located axially of the casing 11. To this shaft is keyed a gear 38 which meshes with a planetary gear 39 keyed to a shaft 40. The gear 38 also meshes with a gear 41 keyed to a shaft 42. The shafts 37, 40 and 42 are in vertical alignment with the gears 39 and 41 upon opposite sides of the gear 38. These three gears are located within a housing 43. The gear 39 neatly fits a cylindrical chamber 44 while gears 38 and 41 are neatly fitted within cylindrical chambers 45 and 46, respectively. The chamber 44 is provided with an arcuately-shaped passage 47 and the chamber 46 has a similar passage 48. A pocket 49 is located between the gears 38 and 39 while a pocket 50 is located between gears 38 and 41. These pockets form respectively delivery chambers for oil which passes from the chamber 31 to the interior of the housing 43.

A cylinder 51 is secured to one face of the housing 43 while a cylinder 52 is secured to the opposite face and diagonally opposite from the cylinder 51. A block 53 is secured to one face of the housing 43 below the cylinder 51 while a second block 54 is secured to the opposite face of the housing above the cylinder 52.

A passage 55 connects the arcuately shaped passage 47 with a passage 56 in the cylinder 51 and this last-mentioned passage is in communication with a pocket 57 in the upper end of the cylinder 51. A plunger 58 is slidably mounted in the cylinder and is provided with a disc 59 located in an expanded portion 60 of said cylinder. A spring 61 is located within the expanded portion 60 of the cylinder and engages the disc 59 for maintaining the plunger 58 in its innermost position. The piston projects beyond a plug 62 threaded into the lower end of the cylinder, as shown at 63, and a centrifugal governor element 65 is pivotally mounted at 66 on the casing 11 and has an arm 67 projecting inwardly below the plug 62 where it is provided with a fork 68 through which the projecting end 63 of the piston 58 is adapted to move. A spring 69 connected with the arm 67 tends at all times to move said arm 67 downwardly as will be presently explained.

A head 70 formed at the upper end of a valve stem 71 is adapted to be engaged by the fork 68 for moving the stem downwardly and controlling the position of the valves connected to said stem. A spring 72 tends to move the head and valve stem upwardly against the downward movement of the arm 67.

A piston 73 is connected to the stem 71 and is provided with an elongated annular groove 74 which operates as an inlet valve to permit fluid from the chamber 31 to enter the housing 43. The annular groove when located opposite a passage 75 in the block 53 connects the inlet port 76 with a chamber 77 in the housing 43. A passage 78 connects the chamber 77 with the pocket 50. A check valve 79 permits liquid from the chamber 31 to enter the groove 74 but will prevent the discharge of the liquid from the housing 43 at this point.

The block is provided with a transverse passage 80 with the piston 73 moving transversely of the passage. The piston is provided with an annular groove 81 of restricted width and this groove is adapted at times to align with the passage 80 to permit the discharge of liquid from the housing.

The chamber 82 is in communication with the passage 80 and a conduit or passage 83 connects the chamber 82 with the arcuately-shaped groove 48 which embraces the gear 41.

The passage 84, controlled by a check valve 85, is adapted to connect the groove or passage 48 with the chamber or interior 31 of the casing 11 at times and for a purpose which will be presently explained. A port 86 is controlled by the check valve 85.

It will be noted that the construction just described is located at one side of the housing 43 and a similar construction is located at the opposite face. However, the duplicate constructions will be described in detail.

The cylinder 52 has a chamber 90 in which is located a spring 91 having one end in engagement with a disc 92 secured to a stem 93 which is movable in the cylinder 52. This stem has one end projecting beyond a plug 94 threaded into the upper end of the cylinder 52. The portion 95 of the stem forms a piston and has its lower end adjacent a chamber 96 at the lower end of the cylinder 52 which is closed by a plug 97. A passage 100 connects the chamber 96 with a passage 101 which is in communication with the arcuately-shaped passage 48. A governor element 102 is pivoted at 103 on the casing 11 and has an arm 104 urged upwardly at all times by a spring 105. The outer end of the arm, as shown at 106, is provided with a fork through which the projecting end 107 of the stem 93 moves.

A piston 108 is slidably mounted in the block 54 and is provided with an annular groove 109 which when it aligns with a transverse passage 110 permits liquid from the chamber 31 to pass the check valve 111 to a chamber 112 which is in communication with a passage 113ª. The last-mentioned passage connects the pocket 49 with the chamber 110.

A groove 113 of restricted width is also carried by the piston 108 and is adapted to be aligned with a transverse passage 114 formed in the block 54. A chamber 115 and a passage 116 connects the passage 114 with the curved groove 47.

A passage 117 is adapted to permit liquid from the chamber 31 of the casing 11 to flow to the groove 47 while a check valve 118 prevents liquid from said groove from being returned to the chamber 31.

The piston 108 is provided with a head 119 which is engaged by a spring 120 tending to force the head outwardly from the pocket 54 so that the groove 109 will be aligned with the passage 110.

Figure 9:
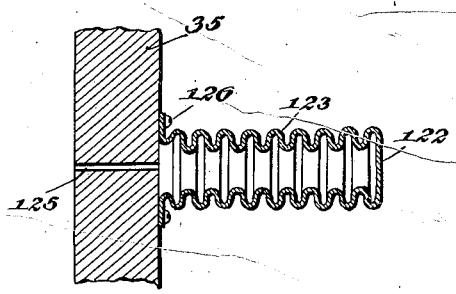
Figure 9 is a vertical section taken along the line 9—9 of Figure 8.
Figure 10:
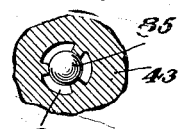
Figure 10 is a section taken along the line 10—10 of Fig. 7.

As shown more particularly in Figs. 6, 8 and 9, pressure compensating devices are shown at 122. They are in the form of tubular members having annular corrugations 123 and the members 122 are formed of flexible material so that the device may be expanded from its normally contracted position. The side wall of the casing 11 which is formed by the flywheel 35 is provided with a passage 125 which is in axial alignment with the member 122 in order to permit air from said member to be forced from the same when pressure of the liquid or oil in the chamber 31 has become sufficiently high to cause contraction of the member 122. By the expansion and contraction of said member variation of the pressure in the casing 31 may be compensated for. As shown at 126, the flanged portion of the member 122 is secured to the side wall 35.

Referring more particularly to Figs. 3 and 5, it will be seen that by the particular construction provided for connecting the stub shaft 130 with a driven shaft 131, the shaft 37 has a splined connection 132 with the shaft 130. The outer end of said shaft is provided with a flange 133 carrying a plurality of bolts 134 upon which are mounted blocks 135.

The disc 136 is secured to one end of the shaft 131 and is located in contact with a bushing plate 137 and this plate is disposed between the flange 133 and the disc 136. A washer 138 is mounted upon the shaft 131 and is located between one face of the disc 136 and a plate 139 which is carried by the bolts 134.

The disc 136 is provided with arcuately-shaped slots 140 which receive the blocks 135. Upon opposite sides of each block is a spring 141 or 142 which are adapted to be compressed or released, depending upon the direction of movement of the blocks 135. The construction just described comprises what I term an energy storing device as will be presently explained.

Referring more particularly to the connection between the shaft 26 and the casing 11, as shown in Figure 3, it will be seen that a similar construction is provided and while the same is shown in section, it contains springs similar to the springs shown at 142 in Figure 5. A plurality of blocks 143 are carried by bolts 33 which in turn are carried by the flange 32. A plate 145 is carried by the bolts 33. A bushing 146 in the shape of a cup embraces the flange 32 and is held in place by the bolts 33. A washer 147 is located between the plate 145 and the inner face of the disc 34. While the construction just described withstands the torque of the motor shaft 26, the construction employed has a connection between the shaft 130 and the shaft 131 stands the torque of the driven shaft 131. A one-way brake element is carried by a boss 150 formed at the inner face of the housing 10. A sleeve 151 is securely fitted within the boss 150 and a disc 152 has a sliding fit, as shown at 153, with the shaft 130 so that the disc 152 may drive the shaft 130 but permits longitudinal movements between the same.

The disc 152 is provided with pockets 154 which are circumferentially disposed in spaced relation with each other and it will be noted that the inner wall 155 of each of the pockets is formed on the curve of a circle which is eccentric to the circle forming the periphery of the disc so that one portion of the wall 155 will be closed to the inner surface of the sleeve 151 so that when the rollers 156 move into this reduced space they will be jammed between the wall 155 and the inner face of the sleeve 151. A spring 157 tends at all times to maintain the rollers 156 in the reduced portion of the pocket. It will be seen by this construction that the rollers will permit direct drive of the shaft 130 but will prevent retrograde movement or a reverse rotation of the shaft for a purpose which will be presently explained.

The casing 10 shown more particularly in Figure 3 has diametrically disposed openings which are closed by the covers 13. These openings are directly opposite plugs 160 threaded into openings 161 at diametrically disposed points in the casing 11 so that it is possible to fill or drain the casing 11 when desired.

The flywheel 35 is provided with teeth 35ª which are adapted to be engaged by a gear connected with the starting mechanism, not shown.

Referring more particularly to Figure 1, it will be seen that the clutch pedal 18 is pivotally mounted at 165 on the housing 10 and is provided with an arm 166. A link 167 connects the arm 166 with an arm 168 secured to a shaft 169 carried by the auxiliary housing 14. A finger 170 is secured to the shaft 169 and is adapted to engage an arm 171 which is connected to a sleeve shown in dotted lines at 172. Since this finger 170 is controlled by a clutch pedal 18 depression of the clutch pedal will cause the finger 170 to move the arm 171 to the left in Fig. 1 and move the sleeve 172 in the same direction, thus releasing pressure of clutch springs mounted in a casing 175. These clutch springs are of a well known construction and need not be further described. When this happens the clutch plate 173 may be moved from the neutral position shown in Fig. 1 either in engagement with the braking disc 174 or the plate 176 which is connected with the casing 175 by the shifting of the lever 19.

The shifting of the lever 19, however, does not move the clutch plate 173 but operates a mechanism of well known construction in the casing 175 which will permit the clutch springs in the casing 175 to shift the clutch plate 173 in opposite directions, depending upon the position of the lever 19.

The shift lever 24 is provided with a fork 180 adapted to engage pins 181 on the shiftable member 182. This shiftable member is connected with an arm 183 which in turn is connected with a sleeve 172 that extends into the casing 175 for operating the mechanism previously described but not shown which controls the shifting of the clutch plate 173 through the clutch springs.

The operation of my device is as follows: The parts shown in Fig. 1 are in neutral position with the clutch pedal 18 released and the engine may be started in the usual manner through rotation of the gear 35ª on the flywheel 35 and the casing 11 being connected with a shaft 26 and the flywheel 35 is, therefore, revolved together with the shaft 131. The mechanism between the shaft 131 and the shaft 27, however, when in neutral position will leave the shaft 27 in idle position and, therefore, the same will not be revolved.

If it be desired to drive the automobile forwardly, the clutch pedal 18 is depressed and the lever 19 through the handle 19ª is rocked forwardly, thereby causing the clutch springs in the casing 175 to move the clutch plate 173 into engagement with a disc 176 so that the shaft 131 will be directly connected with the shaft 27 to permit forward speeds of the vehicle. The accelerator pedal may now be depressed for increasing the speed of the engine.

Referring more particularly to Figure 6 it will be seen that the governor elements 65 and 102 are in an inoperative position while the casing 11 is being revolved at idling speed. At this time the passages 75 and 110 are closed so that no liquid or oil from the chamber 31 is entering the pockets 50 and 49, respectively. The shaft 37 and gear 38 remain stationary with the entire casing 11 and the housing 43 revolving around the shaft and gear. The gears 39 and 41, however, since they mesh with the gear 38 will be caused to be revolved due to the fact that no liquid from the casing 31 is in the pockets 49 and 50 and, therefore, no resistance is exerted against the rotation of the gears 39 and 41.

With the parts shown in position in Fig. 6, and with the gear lever shifted to cause forward speeds, and with the engine sufficiently speeded, the weighted arms 65 and 102 of the governor elements will move outwardly by centrifugal force due to the increased rotation of the casing 11. As they move outwardly, the forks 68 and 106, respectively, will move away from the heads 70 and 110, thereby permitting the respective springs acting outwardly on these heads to move the pistons 73 and 108 so that the annular grooves 74 and 109 of said pistons will begin to align with their respective passages 75 and 110 while the grooves 81 and 113 forming the exhaust will align with their respective passages 80 and 114. Thus it will be seen that a certain amount of the liquid from the chamber 31 will enter the pockets 50 and 49.

As soon as the oil or liquid enters these pockets they will exert a frictional resistance against the rotation of the gears 41 and 39, respectively, and the resistance increases as the passages 75 and 110 are opening wider until a point is reached where these passages are fully opened, permitting pockets 50 and 49 to be filled with liquid. When this happens the liquid creates a sufficient resistance against the rotation of the gears 41 and 39 that they will be substantially locked with the gear 38 and will be revolved as a unit with the casing 43. At this time the automobile will be in direct drive or high speed.

It will be appreciated that by this construction a uniformly increased speed may be progressively had by the gradually increasing quantities of liquid entering the pockets 50 and 49.

While the passages 75 and 110 are of sufficient dimensions to permit oil to enter the pockets 50 and 49 to fill the same for locking the gears 39 and 41 with the gear 38, the discharge ports, however, as shown at 81 and 113, are restricted so that while a definite quantity of liquid only is discharged from the casing 43 to the chamber 31, greater quantities may be drawn into the pockets 50 and 49. In other words, the discharge is maintained constant with a variable increase in the intake.

When the operator is driving the car down a hill, the car will tend to run forwardly and faster than the engine while when the operator starts up a hill a greater load will be placed on the engine so that an increased torque must be placed upon the driven shaft 27 which causes the forward speed of the vehicle. Thus it will be seen that the greater pressure will be exerted on the liquid in the casing 43 and particularly in the curved channels 47 and 48. When this happens the liquid in the chamber 47 will exert its pressure in all directions and upon the upper end of the piston 58 and upon the lower end of the piston 95, causing the pistons to move outwardly against the tension of their respective springs, so that the piston 58 will engage the head 70 of the piston 73 while the piston 95 will engage the head 119 of the piston valve 108, causing the piston valves to be moved inwardly, thereby restricting the inlet passages 75 and 110 while tending to open the discharge passages 81 and 113 so that the liquid which is under pressure within the casing and in the neighborhood of the three gears will be discharged from the casing 43 into the chamber 31. When the quantity of liquid within the pockets 50 and 49 is reduced, the gears 41 and 39 will be revolved slightly, causing a slower rate of rotation of the shaft 37 and gear 38. As the quantity of liquid in the pockets 50 and 49 is decreased, the faster the gears 41 and 39 will be revolved so that the speed of the vehicle will be slowed accordingly.

The pistons 58 and 95, therefore, act as metering devices for the quantity of liquid to be maintained in the housing 43 and in association with the three gears 38, 41 and 39.

Where the vehicle is travelling down a hill and tends to move faster than the engine, the check valves 85 and 118 will permit liquid from the chamber 31 to be drawn into the grooves 48 and 47, respectively, tending to cause the gears 41 and 39 to be locked more completely with the gears 39 against rotation of the gears 41 and 39.

The construction shown in Figure 5, and which forms the connection between the shafts 130 and 131, acts as an energy storing device. In other words, as the shaft 130 tends to revolve the shaft 131, through the rotation of the gear 38, the springs 142 will be compressed by the annular movement of the blocks 135 before they rotate the shaft 131. These springs, however, tend to release the energy stored up therein and would act to cause a reverse rotation of the shaft 131 and likewise the shaft 130. Due to the fact, however, that the roller bearings 156 will prevent retrograde movement or reverse movement of the shafts 130 and 131, the energy must be expended in the direction of rotation of the shafts 130 and 131. By this construction an increased torque will be applied to the driven shaft 131. Since a similar construction is employed for connecting the shaft 26 with the flywheel 35, it will be seen that this last-mentioned construction will stand the torque of the motor.

It must be borne in mind that if the gears 41 and 39 are revolved in a planetary manner about the gear 38, with no oil in the casing 43 and particularly in the pockets 50 and 49, the shaft 131 will not be driven. As soon as some oil is admitted, however, to the pockets 50 and 49, the resistances set up by the oil between the teeth of the gears will decrease the rotation of the gears 41 and 39. Due to the fact, however, that the teeth moving in and out of the spaces between the teeth of the intermeshing gears, there will be a series of successive impulses or impacts created for causing rotation of the gear 38. These impacts are exerted upon the shaft 37 and the shaft 130. Between the impacts, however, or the successive forces applied to the shafts 37, the flywheel 35 will tend to run ahead of the shaft so that the springs 141 and 142 will store up the energy exerted at this time which, through the one-way clutch mechanism controlled by the rollers 156, will be expended in the direction of rotation of the shaft 131, as has been previously explained.

Referring more particularly to Figure 2, it will be seen that there is a slight space, as indicated at 190, between the gears 39 and 41. The liquid or oil in the casing 43 will find its way into this space between the side walls of the gear and the side walls 191 and 192 of the casing 43. This oil will act as a lubricant and finds its way into the bearings 193 which support the pintles or axles 40 and 42 of the gears 39 and 41. The axle, however, is provided with an axial passage 195 so the oil which collects in a pocket 196 adjacent the bearing 193 will find its way through the passage 195 back into the chamber 31 of the casing 11. A cap 197 is threaded into an opening in the wall 191 to maintain the bearing 193 in place.

The shaft 37 is mounted in bearings 198 and 199 carried, respectively, by the side wall 191 and the wall 192. The wall 191 forms part of the side walls of the casing 11. A centrally disposed threaded opening 200 is closed by a plug 201 which registers with the bearing 198. A passage 202, extending axially of the shaft 37, connects a pocket 203 between the bearing 198 and the plug 201 with the interior of the casing 11 or chamber 31 through a radial passage 204 in the shaft 37 which opens directly into the chamber 31.

The overrunning clutch shown in Fig. 4 not only provides means for causing the energy stored up in the springs 141 and 142 to be expended in the proper direction in rotating the shaft 131, but acts as a means to prevent retrograde movement of the vehicle to which the transmission is attached. In other words, while the device is idling and in neutral position, and when the vehicle is on an incline and would tend to roll backwardly, the overrunning clutch prevents reverse rotation of the shaft 131. However, when the clutch pedal 18 is depressed, the shaft 131 is disconnected from the driven shaft 27 whereby the vehicle will be permitted to roll backwardly. However, when the lever 19 in Fig. 1 is moved to forward position, the overrunning clutch in Fig. 4 will maintain the vehicle against retrograde movement and when the engine is speeded up sufficiently to move the vehicle forwardly, the shafts 130, 131, and 27 may be moved in the proper direction for so moving the vehicle.

I claim:

1. In a device for transmitting power between a revolving member and a member to be revolved, a fluid transmission connected with the revolving member, an intermediate member between the fluid transmission and the second member and adapted to have imparted thereto by the transmission a plurality of impacts for revolubly impelling the intermediate member in one direction, means for storing energy developed between the impacts, means for causing said energy to be expended in rotating the second member in a direction which conforms to the direction of rotation of said second member, and means for controlling the force of the impacts and likewise the energy stored in accordance with the speed of rotation of the revolving member.

2. In a device for transmitting power between a revolving member and a member to be revolved, a fluid transmission connected with the revolving member, an intermediate member between the fluid transmission and the second member and adapted to have imparted thereto by the transmission a plurality of impacts for revolubly impelling the intermediate member in one direction, means for storing energy developed between the impacts, a one-way clutch associated with the intermediate member for preventing rotation of the intermediate member in a direction which is opposite to the normal direction of rotation of the second member so that the energy stored will be expended in a direction which conforms to the direction of rotation of the second member, and means for controlling the force of the impacts and likewise the energy stored in accordance with the speed of rotation of the revolving member.

3. In a device for transmitting power between a driving shaft and a driven shaft comprising a fluid transmission directly connected with the driving shaft, an intermediate shaft adapted to be connected to the driving shaft by the fluid transmission and adapted to have imparted thereto a plurality of impacts by the fluid transmission for causing rotation of the intermediate shaft, means for storing energy developed between the impacts, means for causing said energy to be expended in rotating the driven shaft in a direction which conforms to the direction of rotation of the driven shaft, and means for controlling the force of the impacts and likewise the energy stored in accordance with the speed of rotation of the revolving member.

4. In a device for transmitting power between a driving shaft and a driven shaft comprising a fluid transmission directly connected with the driving shaft, an intermediate shaft adapted to be connected to the driving shaft by the fluid transmission and adapted to have imparted thereto a plurality of impacts by the fluid transmission for causing rotation of the intermediate shaft, means for storing energy developed between the impacts, a one-way clutch acting on intermediate shaft to prevent rotation of the shaft in a direction which is opposite to the normal direction of rotation of said shaft so that the stored up energy will be expended in a direction which conforms to the direction of rotation of the driven shaft, and means for controlling the force of the impacts and likewise the energy stored in accordance with the speed of rotation of the revolving member.

5. In a device for transmitting power between a revolving member and a member to be revolved, a fluid transmission connected with the revolving member, an intermediate member between the fluid transmission and the second member and adapted to have imparted thereto by the transmission a plurality of impacts for revolubly impelling the intermediate member in one direction, an energy storing means including a disk rotated by the revolving member, circumferentially arranged blocks secured laterally to the flange, a disk forming part of the driven member and provided with circumferentially arranged slots receiving the blocks, springs arranged upon opposite sides of each block, located in the slots and adapted to be compressed by the blocks, and a one-way clutch associated with the intermediate member for preventing rotation of the intermediate member in a direction which is opposite to the normal direction of rotation of the second member.

6. In a device for transmitting power between a revolving member and a member to be revolved, a fluid transmission connected with the revolving member, an intermediate member between the fluid transmission and the second member and adapted to have imparted thereto by the transmission a plurality of impacts for revolubly impelling the intermediate member in one direction, an energy storing means including a pair of juxtaposed disks, one of the disks being connected to the revolving member, the other disk being connected to the driven member, a plurality of curved spaced blocks projecting laterally from one disk, the other disk having a plurality of curved slots receiving the block and resilient means cushioning the blocks and adapted to periodically store energy when the driven member is revolved, and a one-way clutch associated with the intermediate member for preventing rotation of the intermediate member in a direction which is opposite to the normal direction of rotation of the second member.

7. In a device for transmitting power between a revolving member and a member to be revolved, a fluid transmission connected with the revolving member, an intermediate member between the fluid transmission and the second member and adapted to have imparted thereto by the transmission a plurality of impacts for revolubly impelling the intermediate member in one direction, an energy storing means including a disk rotated by the revolving member, circumferentially arranged blocks secured laterally to the flange, a disk forming part of the driven member and provided with circumferentially arranged slots receiving the blocks, springs arranged upon opposite sides of each block located in the slots and adapted to be compressed by the blocks, and means for causing the energy stored in the springs to be expended in rotating the driven shaft in a direction which conforms to the direction of rotation of the driven shaft.

EDWIN E. FOSTER.